Figure 1:
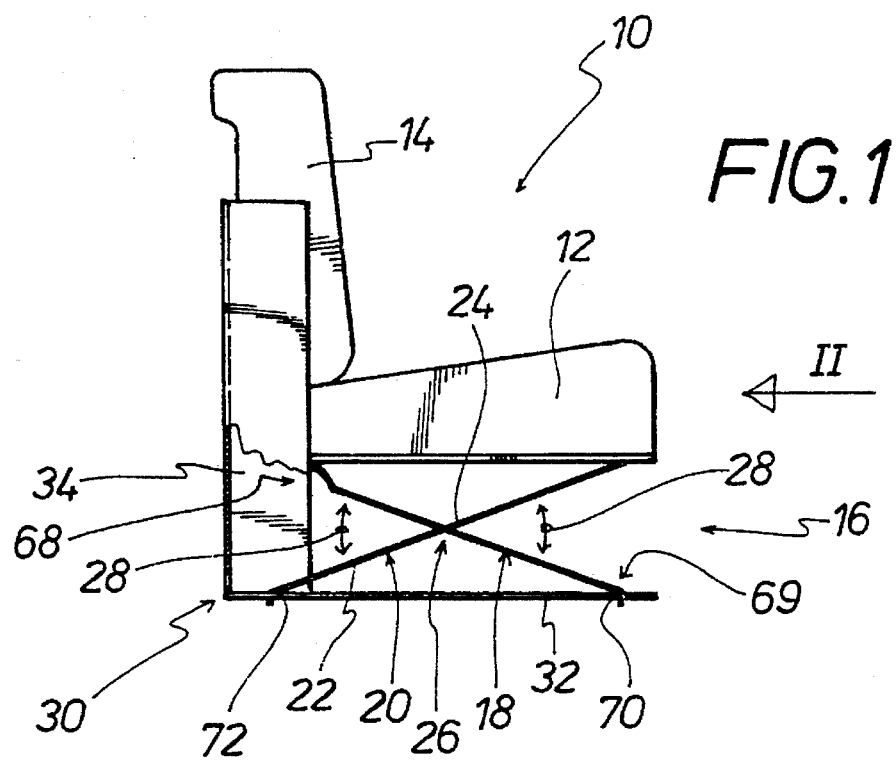

United States Patent [19]
Meiller et al.

[11] Patent Number: 5,490,657
[45] Date of Patent: Feb. 13, 1996

[54] SEAT, IN PARTICULAR A VEHICLE SEAT

[75] Inventors: Hermann Meiller; Matthias Mayer, both of Amberg; Josef Hoerner, Regensburg, all of Germany

[73] Assignee: Grammer AG, Amberg, Germany

[21] Appl. No.: 313,295

[22] PCT Filed: Apr. 1, 1993

[86] PCT No.: PCT/EP93/00787

§ 371 Date: Oct. 3, 1994

§ 102(e) Date: Oct. 3, 1994

[87] PCT Pub. No.: WO93/19950

PCT Pub. Date: Oct. 14, 1993

[30] Foreign Application Priority Data

Apr. 3, 1992 [DE] Germany ............ 42 11 093.9

[51] Int. Cl.⁶ .................................................. F16M 13/00
[52] U.S. Cl. .................. 248/588; 248/575; 297/344.16
[58] Field of Search ................... 248/588, 421, 248/631, 575; 297/344.12, 344.16, 344.15

[56] References Cited

U.S. PATENT DOCUMENTS

| | | | |
|---|---|---|---|
| 2,690,786 | 10/1954 | Sedlock | 248/588 X |
| 3,090,647 | 5/1963 | Moore | 297/344.16 X |
| 3,761,045 | 9/1973 | Sturhan | |
| 3,954,298 | 5/1976 | Lowe | 297/344.16 X |
| 4,089,499 | 5/1978 | Ware | 248/588 |
| 4,286,765 | 9/1981 | Delgleize | 297/344.15 X |
| 4,659,052 | 4/1987 | Nagata | 248/421 X |
| 5,176,355 | 1/1993 | Carter | 248/631 X |
| 5,222,709 | 6/1993 | Culley | 248/421 |
| 5,251,864 | 10/1993 | Itou | 297/344.12 |

FOREIGN PATENT DOCUMENTS

| | | | |
|---|---|---|---|
| 773617 | 11/1934 | France . | |
| 598748 | 5/1934 | Germany . | |
| 1530670 | 8/1969 | Germany . | |
| 2305582 | 8/1973 | Germany . | |
| 2704920 | 8/1978 | Germany | 248/588 |
| 2704921 | 8/1978 | Germany | 248/588 |
| 2057260 | 4/1981 | United Kingdom . | |
| 2129678 | 5/1984 | United Kingdom | 297/344.15 |
| 2169504 | 7/1986 | United Kingdom . | |

*Primary Examiner*—J. Franklin Foss
*Attorney, Agent, or Firm*—Elliot M. Olstein; Raymond J. Lillie

[57] ABSTRACT

Described is a seat (10) having a spring means (36) with which the springing characteristic of the seat (10) can be adjusted as desired. For that purpose a two-armed pivot lever (38) is provided on a back element (34) of the seat (10) at least approximately horizontally and is pivotable about a central mounting axis (40). At least one at least approximately horizontally arranged tension spring (48) is fixed by its one end portion (50) to the one arm (44) of the pivot lever (38), the second end portion (54) of the tension spring (48) being fixed to a fixing portion (56) of a support lever (58). The fixing portion (56) is at least approximately aligned with the mounting axis (40). The support lever (58) is mounted pivotably to the back element (34) and is pivotally connected by its fixing portion (56) to a scissor element (18) of a scissor support assembly (16).

6 Claims, 3 Drawing Sheets

SEAT, IN PARTICULAR A VEHICLE SEAT

The invention concerns a seat, in particular a vehicle seat, comprising a spring means whose springing characteristic can be adjusted as desired, wherein the seat has an L-shaped base means with a bottom element and a back element which projects upwardly from the bottom element and a scissor support assembly is disposed on the bottom element.

In seats of that kind, there is often only a relatively small amount of space available for the spring means so that a correspondingly small spring means must be used. However small or short spring means of that kind normally have a hard spring rate, that is to say a hard springing characteristic, which is to be considered disadvantageous.

A seat of the kind set forth above is known from US-A-3 761 045. In that known seat the spring means is disposed in the back element of the base means. The prestressing of the spring means is adjustable so that weight adjustment for the seat is possible. It is also the case with this known seat that a relatively short spring means is usually employed, as a result of the amount of space available for arranging the spring means, and that gives rise to a more or less hard springing characteristic.

Figure 6:
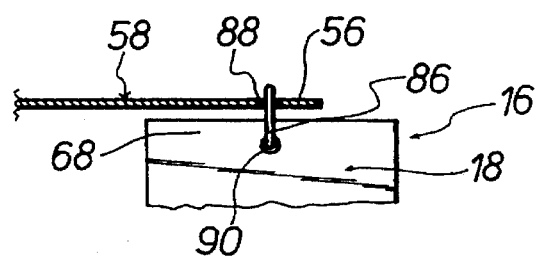

FR-A-773 617 shows for example in FIG. 6 a seat having a spring means which is disposed between a vertical back element of a base means, and the seat. The spring means is connected to a flexible element which is guided around a direction-changing roller provided on the seat.

German patent specification No 598 748 discloses a swing saddle which serves as a pillion passenger seat for motorcycles and other vehicles, with tension springs which are disposed beneath the saddle cover and which are fixed by a ball joint-like arrangement at one end to a fixed point on the substructure of the pillion passenger seat and are suspended with the other end on a projection on a pendulum-type lever in notches, adjustably by hand. For the purposes of adjusting the springs while moving the shaft or spindle which rotatably carries the adjustable ends of the springs by means of blocks with bores therethrough has tooth portions which are fixedly connected to the shaft at two locations, the tooth portions in turn engaging into corresponding tooth notches on the two pendulum-type lever projections. There, by displacement of the hand lever, it is possible to effect a pivotal movement of the pendulum-type lever about its mounting axis, whereby the spring means is stressed to a greater or lesser degree and thus the spring characteristic can be adjusted as desired. This however does not involve a seat of the general kind set forth herein.

GB-A-2 169 504 discloses a springing arrangement for a seat or for a seat of the kind set forth in the opening part of this specification, wherein by varying the prestressing of the spring means it is possible to adjust the springing characteristics of the seat as desired. The above-mentioned considerations also apply in regard to this known seat, namely that a relatively short spring means affords a correspondingly hard springing characteristic.

A sprung driving seat for tractors, the seat pan of which is supported relative to the chassis by way of a rocking arm which on the one hand is mounted fixedly to the seat pan and which on the other hand is pivoted to a part which is fixed with respect to the vehicle, and a gas spring disposed between the rocking arm and a part which is fixed with respect to the vehicle, is known from German published specification (DE-AS) No 15 30 670. In that arrangement, pivoted to the underside of the seat pan is an adjusting lever which, at its downwardly facing free end, carries a tension spring arrangement disposed with its other end on a part which is at a higher level and which is fixed with respect to the vehicle, which adjusting lever can be moved into an approximately horizontally forwardly facing position. A pivotal movement of the adjusting lever causes a corresponding linear change in the length of the tension spring arrangement and therewith a linear change in the hardness of the springing characteristic of the seat.

The invention is based on the problem of providing a seat of the kind set forth in the opening part of this specification, which, in spite of the use of a short spring means and accordingly a relatively hard springing characteristic, has a soft springing effect with suitable adjustment.

In accordance with the invention that problem is solved in that a two-armed pivot lever is pivotable on the back element of the L-shaped base means about a central mounting axis, the spring means which comprises at least one tension spring being fixed by its one end portion to one arm of the pivot lever, the second end portion of the spring means being fixed in axially at least approximately aligned relationship with the mounting axis to a fixing portion of a support lever which is disposed in the vicinity of the arm, which has the spring means, of the pivot lever, and is mounted pivotably by a mounting portion to the back element and is pivotally connected to the scissor support assembly. In that arrangement the pivot lever and the at least one tension spring are desirably disposed at least approximately horizontally, wherein the second arm of the pivot lever is designed with an actuating handle and the support lever includes an acute angle with the pivot lever or the spring means. Such a configuration has the advantage that, adapted to the transverse or widthwise dimensions of the seat or the back element of the L-shaped base means, a spring means with at least one tension spring can be used, wherein the/each tension spring can have a hard springing characteristic as a result of its relatively short axial dimensions. In the normal rest position of the pivot lever in which the pivot lever and the spring means are oriented at least approximately horizontally, the spring means is virtually not stretched when the scissor support assembly of the seat is subjected to a loading, which means that in that position of the pivot lever, the springing characteristic of the seat is very soft. When however the pivot lever is pivoted about its central mounting axis, then, upon a corresponding loading on the scissor support assembly, the spring means is stretched and consequently the seat has a harder springing characteristic.

Besides the particular advantage of a possible soft spring characteristic when using a spring means which in itself is hard, in accordance with the invention there is the further advantage that adjustment of the pivotal lever is quickly possible at any time, which hitherto was not the case for example when using spindle drives for weight adjustment of the seat.

A simple design configuration is provided if the support lever is mounted linearly displaceably pivotably on the back element. For that purpose the support lever may be provided with a projection which is simply inserted into an associated hole in the back element of the base means of the seat. Likewise it would be possible for the support lever to be mounted on the back element of the base means not linearly but only pivotably, and for that purpose it would be possible for the support lever itself to be telescopically variable in respect of its length. The back element of the L-shaped base means of the seat also serves at the same time for linearly movably guiding the backrest of the seat which is supported on the base means by way of the scissors support assembly.

As already mentioned above, in the seat according to the invention, the spring means preferably has at least one tension spring with a high spring constant, which means that the/each tension spring can be relatively compact and accordingly only requires a small amount of installation space on the seat.

A further improvement in seat comfort can be achieved in the seat according to the invention if a damping means is provided between the pivot lever and the support lever at least approximately parallel in relation to the spring means.

It has been found advantageous if the fixing portion of the support lever is pivotally connected to an end portion of a central element of the scissors support assembly, which central element is pivotably movably mounted with its oppositely disposed second end portion to the bottom element of the base means, wherein the scissor support assembly preferably has, besides the central element, two strip elements which are disposed laterally beside the central element and which, forming a plane which crosses the plane of the central element, are connected together by means of a connecting element which lies on the central element. In that arrangement the central element may be in the form of a flat element or it may be in the form of a frame configuration in order to provide for a corresponding reduction in weight.

Overall there is provided a seat, in particular a vehicle seat, which is of a simple structure and which is easy to assemble and in which the spring characteristic can be adjusted as desired without involving a great deal of time and force, while at the same time a soft springing characteristic and easily operable adjustment with rapid adjustability can be achieved and is afforded.

Further details, features and advantages are apparent from the following description of embodiments, which are illustrated diagrammatically in the drawing, of the seat according to the invention, in particular a vehicle seat.

Figure 2:
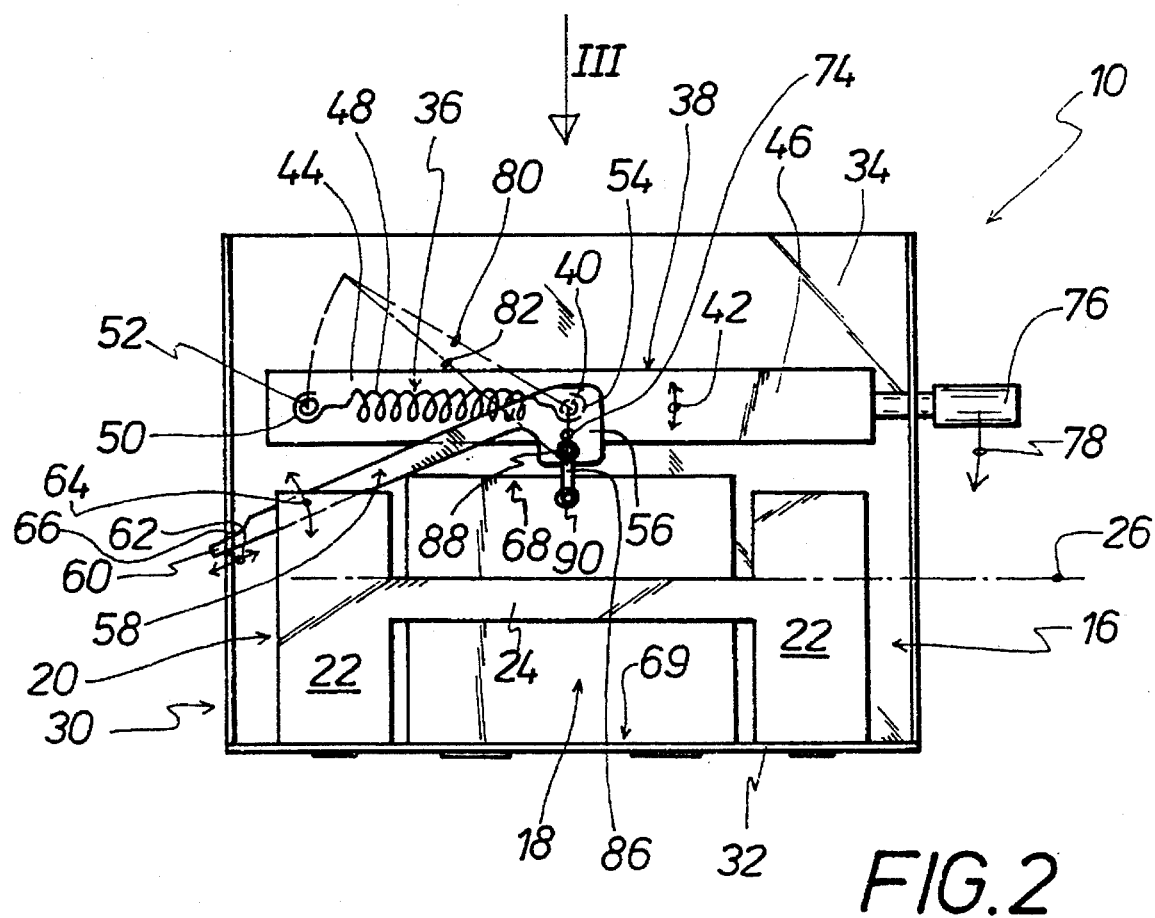
Figure 3:
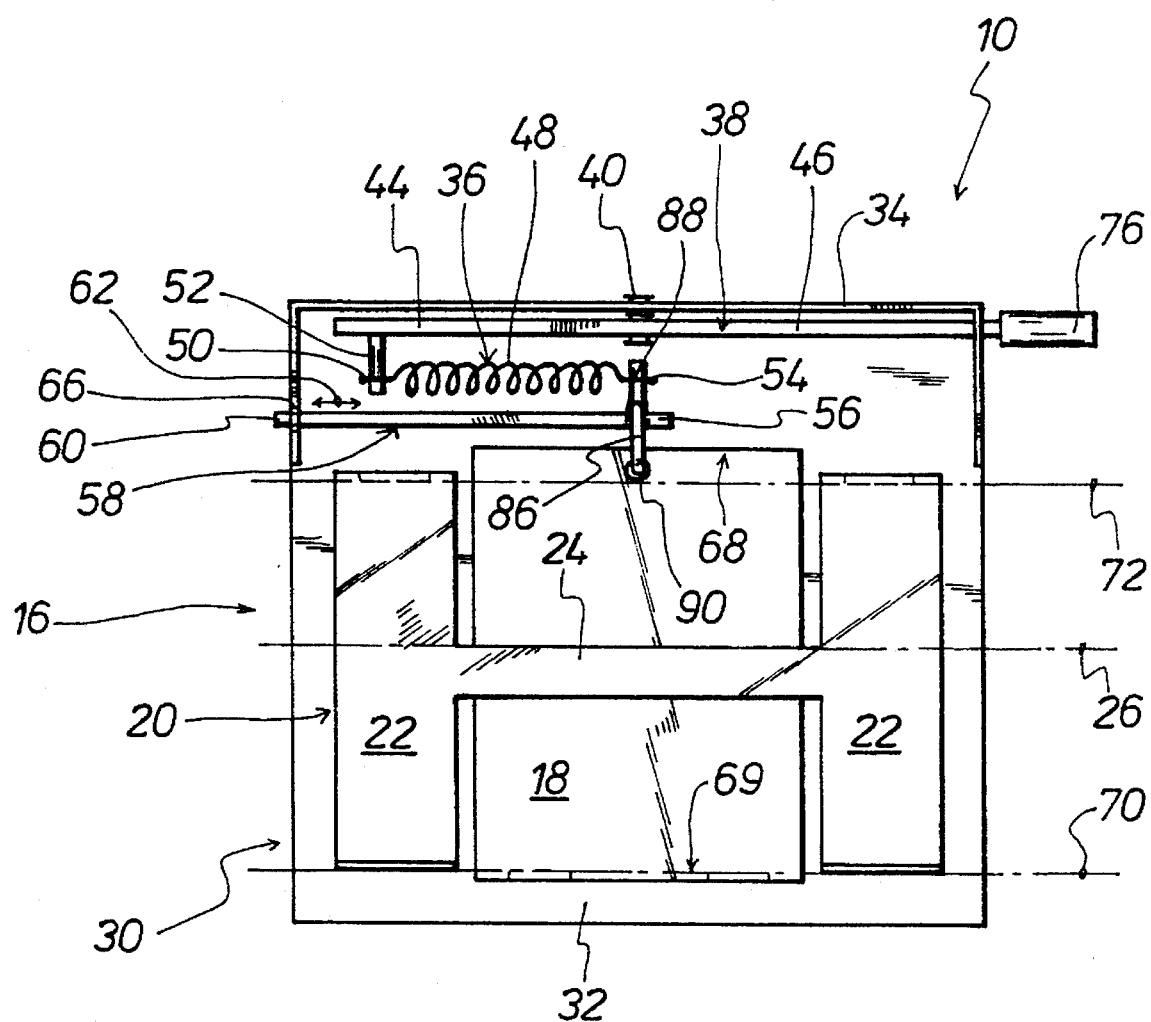
Figure 4:
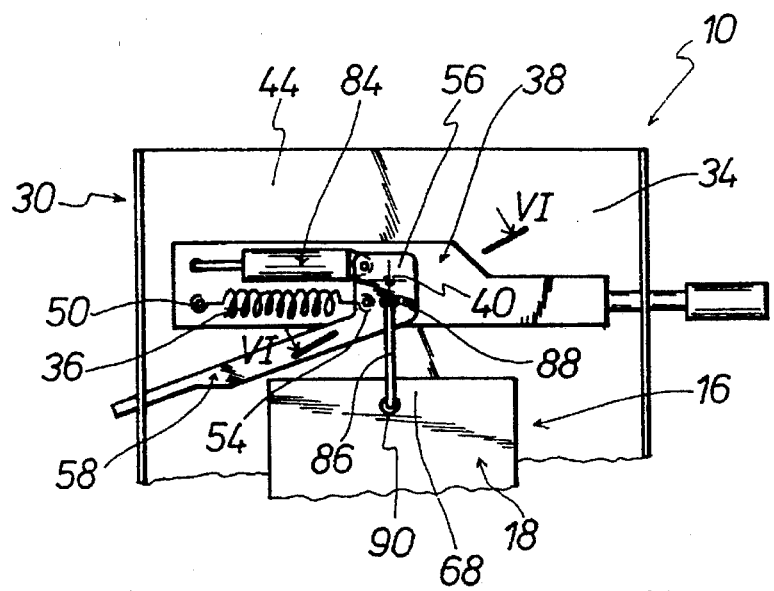
Figure 5:
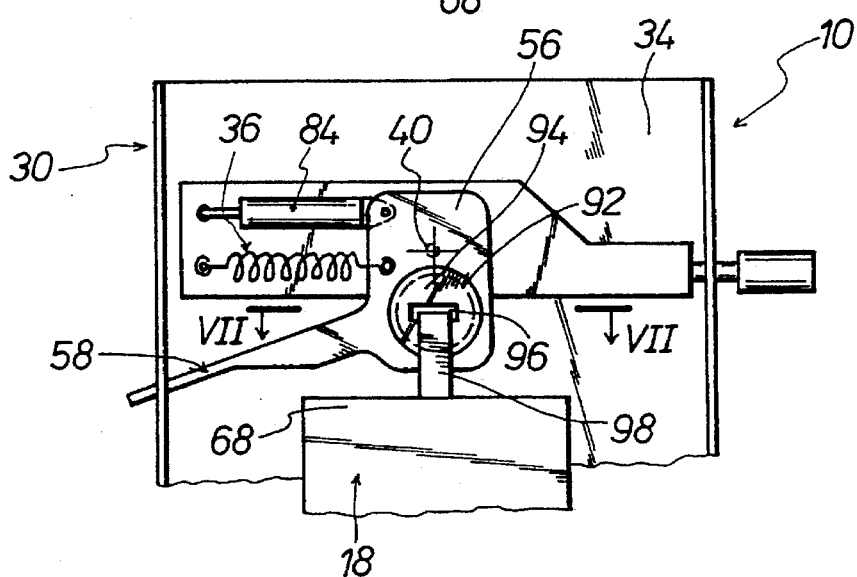
Figure 7:
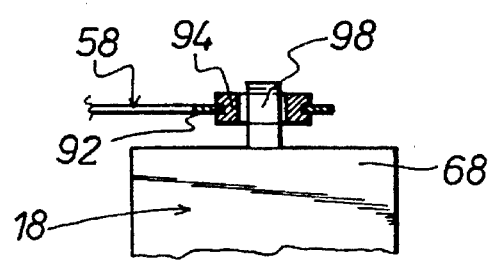

In the drawing:

FIG. 1 is a diagrammatic side view of the seat,

FIG. 2 is a front view of the seat shown in FIG. 1 looking in the direction indicated by the arrow II, without showing the seat squab plate and the backrest of the seat, FIG. 3 is a view of the essential parts of the seat shown in FIG. 2, looking from above in the direction of view indicated by the arrow III, FIG. 4 shows a portion of an embodiment of the seat similarly to the configuration shown in FIG. 2, FIG. 5 is a view similar to FIG. 4 showing a portion of a further embodiment of the seat, FIG. 6 is a view in section taken along section line VI—VI in FIG. 4, and FIG. 7 is a view in section taken along section line VII—VII in FIG. 5.

FIG. 1 is a diabetic side view of a seat 10, in particular a vehicle seat, which has a seat squab plate 12 and a backrest 14 which projects upwardly from the seat squab plate 12. The seat squab plate 12 is arranged on a support scissor assembly 16 which has mutually crossing scissor elements 18 and 20. The scissor element 18 is in the form of a full or frame element, as can be seen from for example FIGS. 2 and 3. The scissor element 20 has two strip elements 22 which laterally enclose the scissor element 18 and which are connected together by means of a connecting element 24 which lies on the scissor element 18 along a line contact and which forms a scissor support assembly axis 26 about which the two scissor elements 18 and 20 are pivotable relative to each other, as is indicated in FIG. 1 by the two double-headed arrows 28.

The scissor support assembly 16 is arranged on an L-shaped base means 30 which has a bottom element 32 and a back element 34 which projects upwardly from the bottom element 32. The bottom element 32 serves for mounting the scissor support assembly 16 and the back element 34 serves for linearly guiding the back portion 14 of the seat 10.

Connected to the scissor support assembly 16 for providing springing of the seat 10 is a spring moans 36 whose configuration and arrangement is described hereinafter with reference to FIGS. 2 and 3.

FIGS. 2 and 3 show a pivot lever 38 which is mounted pivotably to the back element 34 of the base moans 30 by moans of a mounting axis 40 which is disposed in a central region of the pivot lever 38. The pivotal movement is indicated in FIG. 2 by the arcuate double-headed arrow 42.

The mounting axis 40 provides a two-armed pivot lever 38 having a lever arm 44 and a second lever arm 46. A tension spring 48 forming the spring moans 36 is fixed with its one fixing end 50 to the end portion of the first lever arm 44, that is remote from the mounting axis 40. For that purpose the lever arm 44 is provided for example with a fixing pin 52. The second fixing end 54 of the tension spring 48 is secured to a fixing portion 56 of a support lever 58, the support lever 58 being disposed at a spacing in front of the pivot lever 38 (see FIG. 3). The support lever 58 is mounted by a mounting portion 60 which is remote from the fixing portion 56 to the back element 34 of the L-shaped base moans 30 linearly (arrow 62 in FIGS. 2 and 3) and pivotally movably (arrow 64 in FIG. 2). For that purpose the back element 34 has a hole 66 into which the mounting portion 60 of the support lever 58 projects.

The fixing portion 56 of the support lever 58 is pivotally connected to the one end portion 68 of the scissor element 18 of the scissor support assembly 16. Possible configurations of the pivotal connection between the fixing portion 56 of the support lever 58 and said first end portion 68 of the scissor element 18 of the scissor support assembly 16 are also shown in FIGS. 4 through 7 and are discussed in greater detail hereinafter with reference to those Figures.

The second end portion 69 of the scissor element 18 which is opposite to the first end portion 68 (see also FIG. 1) is mounted to the bottom element 32 of the base means 30 pivotably about a mounting axis 70 (see FIGS. 1 and 3). The second scissor element 20 is arranged on the bottom element 32 of the base means 30 pivotably about a mounting axis 72 which is parallel to the mounting axis 70 (see FIGS. 1 and 3).

In FIG. 2 the pivot lever 38 and the tension spring 48 are disposed at least approximately horizontally. If the seat 10 is loaded with the pivot lever 38 in that position, that is to say if for example a user of the seat sits on the seat 10, the scissor support assembly 16 is correspondingly pivoted together (double-headed arrow 28 in FIG. 1), that is to say, the fixing portion 56 of the support lever 58 moves vertically downwardly in the direction indicated by the arrow 74 (see FIG. 2), corresponding to the first end portion 68 of the scissor element 18. When that happens, the tension spring 48 is virtually not stretched, which means that, in the horizontal position of the pivot lever 38 shown in FIG. 2, a soft springing characteristic is provided even when a hard tension spring 48 is used. If however the pivot lever 38 is pivoted downwardly about the central mounting axis 40 in the direction of the arrow 78 (see FIG. 2) by means of an actuating handle 76 which projects away from its second lever arm 46, then the tension spring 48 comes to lie for example in a position indicated by the broken line 80. If in that position the seat 10 is loaded or a user of the seat sits on the seat 10, then—as is readily apparent from FIG. 2—, corresponding to the movement of the scissor element 18 and the fixing portion 56 of the support lever 58, that involves a movement in the direction of the arrow 74 and thus a corresponding increase in the length of the tension spring 48, which is indicated by the dash-dotted line 82. That increase in the length of the tension spring 48 corresponds to a harder springing characteristic thereof.

In accordance with the invention therefore there is provided a seat 10 in which any desired springing characteristic, that is to say any desired springing performance, can be adjusted quickly and without involving a large amount of force, while a soft springing effect can also be achieved with a hard spring.

FIG. 4 shows parts of the seat 10, that is to say it shows a part of the back element 34 of the base means 30, on which the pivot lever 38 is pivotably mounted. A spring means 36 which is a tension spring is fixed by its first fixing end 50 to the first lever arm 44 of the pivot lever 38. By means of its second fixing portion 54, the spring means 36 is fixed to a support lever 58, in a similar manner to the embodiment of the seat 10 which is shown in FIGS. 2 and 3. A damping means 84 is disposed at least approximately parallel to the spring means 36 between the first lever arm 44 of the pivot lever 38 and the support lever 58 or the fixing portion 56 thereof.

The fixing portion 56 of the support lever 58 is pivotally connected to the scissor element 18, a portion of which is shown, of the scissor support assembly 16, by means of a clip or ring element 86. For that purpose the clip or ring element extends movably through a hole 88 in the fixing portion 56 of the support lever 58 and through a hole 90 which is provided on the first end portion 68 of the scissor element 18.

FIG. 4 does not show the second scissor element 20 with the strip elements 22 which are disposed laterally of the scissor element 18 (see FIGS. 2 and 3).

The support lever 58 is mounted on the back element 34 of the base means 30 in a similar manner to the embodiment of the seat 10 shown in FIGS. 2 and 3, so that there is no need to discuss this again in detail here.

FIG. 6 is a view in section of part of the support lever 58 and a part of the scissor element 18 with the hole 90 which is provided on the first end portion 68 and through which the clip or ring element 86 extends for pivotal connection of the scissor element 18 of the scissor support assembly 16 to the fixing portion 56 of the support lever 58. The hole which is provided in the fixing portion 56 of the support lever 58 and through which the clip or ring element 86 movably extends is also identified by reference numeral 88 in FIG. 6.

Another possible form of the pivotal connection between the support lever 58 or its fixing portion 56 and the scissor element 18 or the first end portion 68 thereof is shown in FIGS. 5 and 7. In this embodiment the fixing portion 56 has a round hole 92 in which a disk 94 is rotatably and non-losably mounted. The disk 94 has a hole 96 through which extends a projection 98 which is for example of a hook-like configuration and which integrally projects away from the first end portion 68 of the scissor element 18.

In other respects the embodiment of the seat 10 shown in FIGS. 5 and 7 is similar to the embodiment of the seat 10 shown in FIGS. 4 and 6 so that there is no need for all further details of the seat 10 to be described in detail once again.

The same details are identified by the same references in the individual Figures so that there is no need for all features to be described in detail again in connection with the respective individual Figures of the drawings.

We claim:

1. A seat, in particular a vehicle seat, comprising a spring means (36) whose springing characteristic can be adjusted as desired, wherein the seat (10) has an L-shaped base means (30) with a bottom element (32) and a back element (34) which projects upwardly from the bottom element (32) and a scissor support assembly (16) is arranged on the bottom element (32), characterised in that a two-armed pivot lever (38) is mounted on the back element (34) pivotably about a central mounting axis (40), a spring means (36) which has at least one tension spring (48) being fixed by its one end portion (50) to one arm (44) of the pivot lever (38), the second end portion (54) of the spring means (36) being fixed in axially at least approximately aligned relationship with the mounting axis (40) to a fixing portion (56) of a support lever (58) which is provided in the vicinity of the arm (44), having the spring means (36), of the pivot lever (38) and is mounted pivotably by a mounting portion (60) to the back element (34) and is pivotally connected to the scissor support assembly (16).

2. A seat according to claim 1 characterised in that the pivot lever (38) and the at least one tension spring (48) are disposed at least approximately horizontally, wherein the second arm (46) of the pivot lever (38) has an actuating handle (76).

3. A seat according to claim 1 or claim 2 characterised in that the support lever (58) is mounted linearly displaceably pivotably to the back element (34).

4. A seat according to one of the preceding claims characterised in that the spring means (36) has at least one tension spring (48) with a high spring constant.

5. A seat according to one of the preceding claims characterised in that a damping means (84) is provided between the pivot lever (38) and the support lever (58) at least approximately parallel to the spring means (36).

6. A seat according to one of the preceding claims characterised in that the fixing portion (56) of the support lever (58) is pivotally connected to an end portion (68) of a central element (18) of the scissors support assembly, the central element being pivotably mounted with its oppositely disposed second end portion (69) to the bottom element (32) of the base means (30), wherein besides the central element (18) the scissor support assembly (16) has two strip elements (22) which are disposed laterally beside the central element (18) and which, forming a plane crossing the plane of the central element (18), are connected to each other by means of a connecting element (24) which lies on the central element (18).

* * * * *